United States Patent [19]
Lyman, Jr.

[11] 4,190,962
[45] Mar. 4, 1980

[54] NAVIGATION DEVICES

[76] Inventor: Harold T. Lyman, Jr., 75 Bryan Hill Rd., Milford, Conn. 06460

[21] Appl. No.: 894,103

[22] Filed: Apr. 6, 1978

[51] Int. Cl.$^2$ ............................................. G01C 21/08
[52] U.S. Cl. ................................... 33/363 K; 33/348; 73/178 R; 340/366 B
[58] Field of Search ................... 73/178 R; 33/363 K, 33/1 PT; 340/366 B

[56] References Cited

U.S. PATENT DOCUMENTS

| | | | |
|---|---|---|---|
| 3,927,474 | 12/1975 | Lapeyre et al. | 33/363 K |
| 4,132,113 | 1/1979 | Lyman | 73/178 R |

Primary Examiner—Donald O. Woodiel

[57] ABSTRACT

Improvements are disclosed in the pattern cone of the magnetic compass as described and claimed in copending application 769409, Harold T. Lyman, Jr., now U.S. Pat. No. 4,132,113. Simpler apparatus for trimming the sensor outputs of the sine and cosine of the angle between the craft's actual heading and the desired heading, are described and claimed. As in the said copending application the basic apparatus consists of a magnetic compass containing a pattern having a specified relation of black-to-white density with respect to angle, rotating with the compass card, a light source for illumination of the pattern, pairs of sensors mounted in the compass and responsive to the light intensity reflected from or transmitted through the pattern, the output from one pair of sensors being proportional to the sine of the angle made by the sensor pair zero reference line with respect to Magnetic North, and the output of the other pair of sensors being proportional to the cosine of said angle, both outputs being suitable for operation of a remote indicating compass, and various modifications thereof for making the outputs of the sensor pairs proportional to the sine and cosine of the angle between a manually settable desired heading or angle and the angle of the said sensor pair zero reference line with respect to Magnetic North.

3 Claims, 3 Drawing Figures

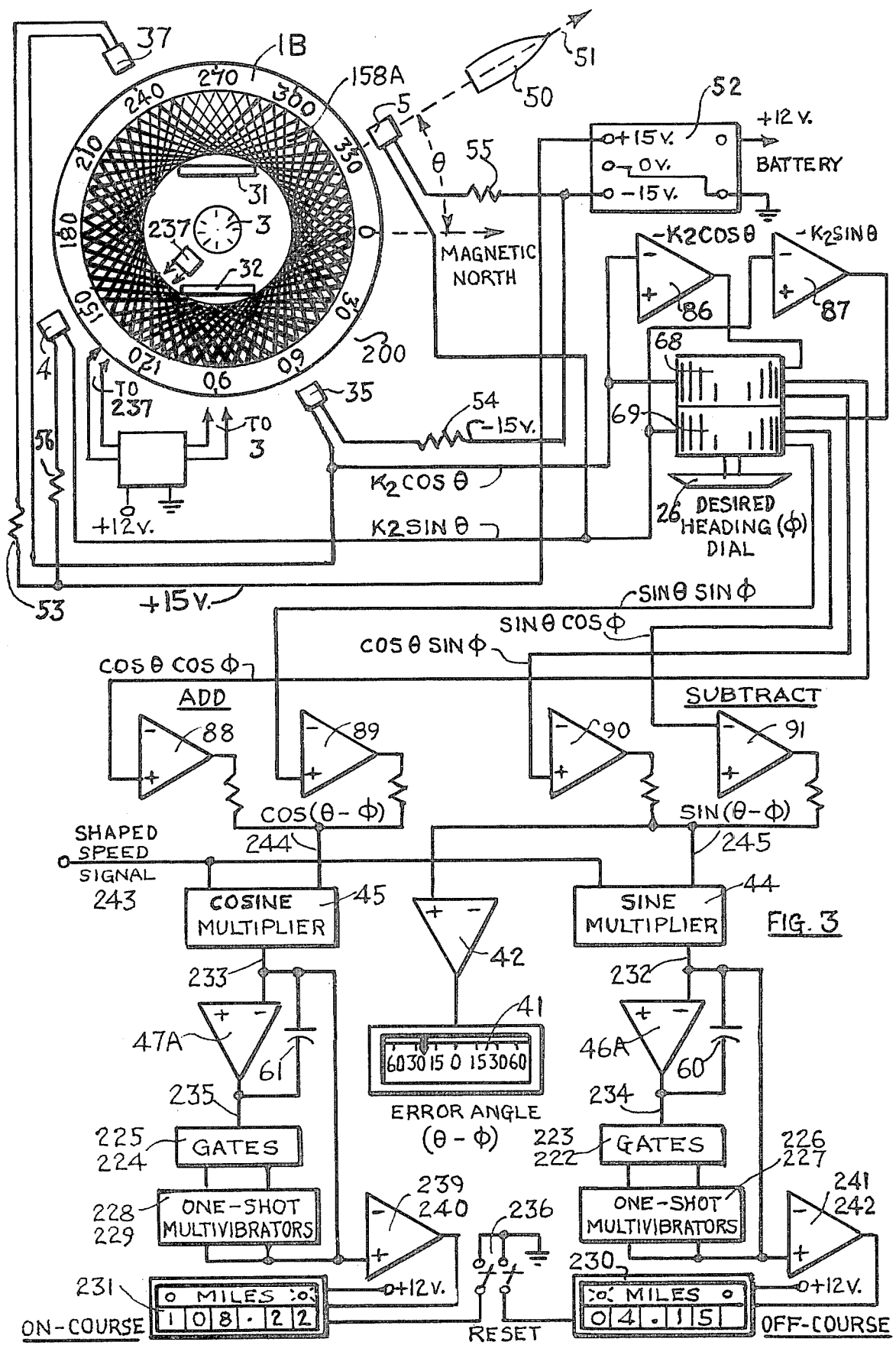

NAVIGATION DEVICES

This invention relates to navigational devices, and more particularly to distance-computing and steering angle display devices utilized in navigation.

The principal object of the invention is improvement and simplification of the means disclosed in copending application Ser. 769409, Harold T. Lyman, Jr., said means being the automatic computation and display of a craft's coordinates with respect to a preselected starting point and course, the latter also being designated as the desired heading in the following description.

Figure 1:
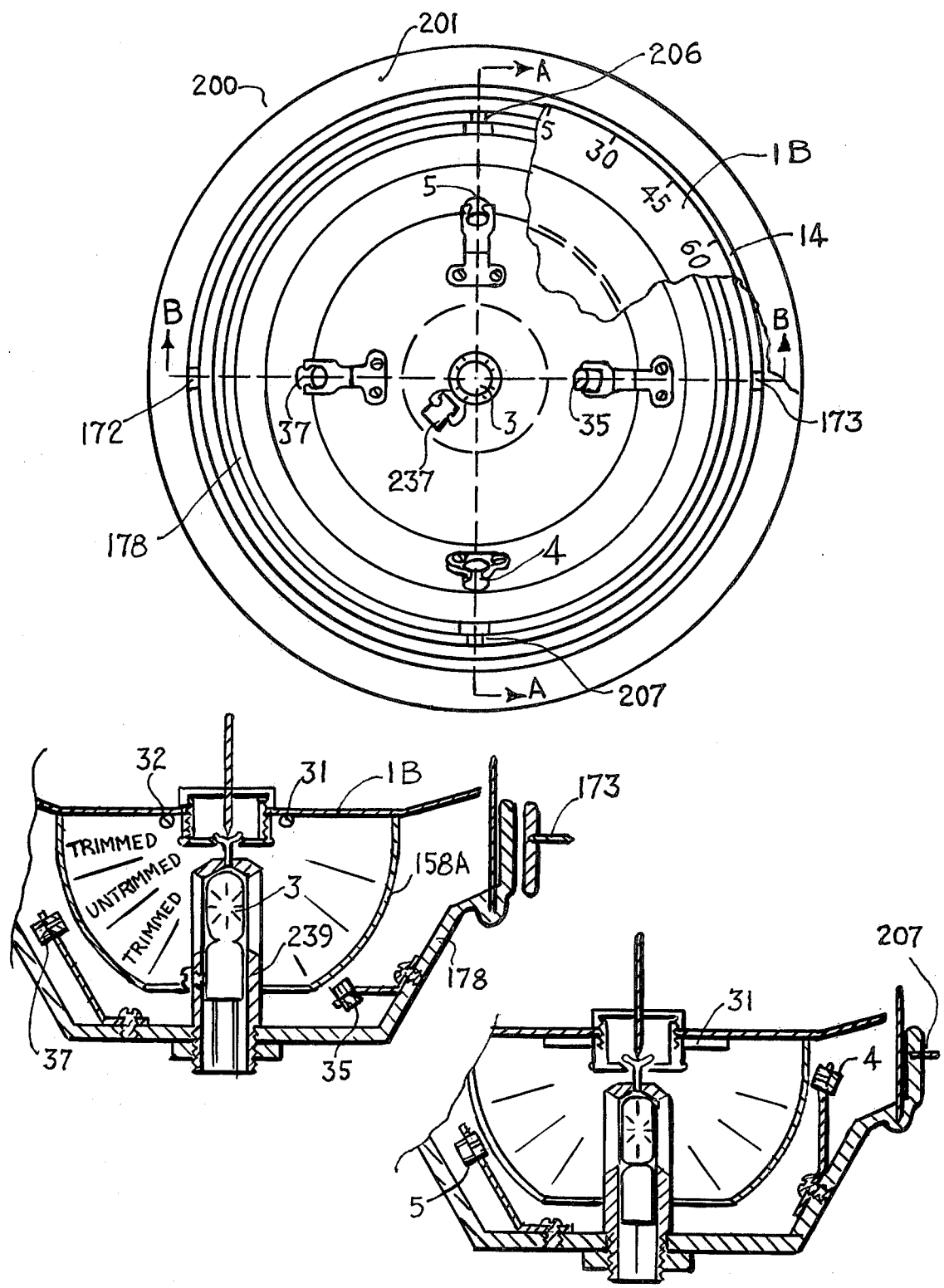

The improvements and simplifications consist principally in a new compass pattern cone, FIG. 1 shows a gimballed magnetic compass 200 having a tray 178, a compass card 1B under which magnets 31 and 32 are fastened, a light source 3, a pattern cone 158A and sensors 4, 5, 35 and 37, the numbers being the same as in said copending application.

Figure 2:
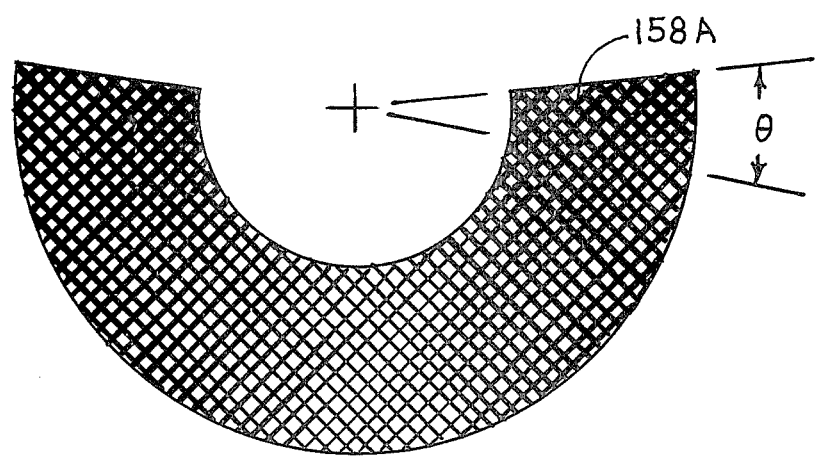

FIG. 2 shows the flat, developed translucent density pattern 158A before forming having the density-vs-angle relation $$D' = K_1 + K_2 \cos \theta$$

where $K_1$ and $K_2$ are constants, not necessarily equal, and the angle $\theta$ is referenced to the darkest part of the pattern.

FIG. 3 is a block diagram of the navigation system utilizing the compass of FIG. 1.

The basic relation between the pattern cone angle and sensor output when two sensors are located 180° to each other and are connected in a differential circuit is, assuming sensor linearity, $$E_{out1} = (E_1 - E_2) \approx (K_1 + K_2 \cos \theta) - [K_1 + K_2 \cos (\theta + 180°)] = 2K_2 \cos \theta$$

Thus the diffuse background light and fixed minimum density response of the sensors is balanced out.

Similarly a pair of sensors at right angles to the first pair, and differentially connected will yield $$E_{out2} = (E_3 - E_4) \approx [K_1 + K_2 \cos (\theta + 90°)] - [K_1 + K_2 \cos (\theta + 270°)] = -2K_2 \sin \theta$$

While the sensor response over the range of pattern density illustrated in FIG. 1 can be made quite linear there is still a slight amount of non-linearity and further the non-linearity is different from sensor to sensor, so it is highly desirable to have a means of exact trimming of the density pattern in which the response of the sine and cosine sensor pairs can be differently adjusted. For this reason the gimballed compass tray 178 is made sufficiently deep so that the pattern cone 158A can subtend a vertical angle of 60° to 70°, in order that enough angular separation may be obtained between sensors of a pair to make it possible to trim the upper one-third for one pair of sensors, and to trim the lower third for the other pair of sensors, and also to allow for a reasonable swinging of the card and cone in rough navigational conditions without effect on sensor calibration.

Thus if we take sensor 5 as the untrimmed sine sensor located opposite the middle third of the pattern cone, and sensor 37 as the untrimmed cosine sensor also located opposite the middle third of the pattern cone, and sensor 4 as the trimmed sine sensor opposite the upper third of the pattern cone, then sensor 35 becomes the trimmed cosine sensor opposite the lower third of the pattern cone.

A convenient pattern cone for trimming purposes is made from a semi-matte Mylar sheet with a photographic pattern in an emulsion bonded to its surface, such as furnished by Etchomatic of Waltham, Massachusetts, and which is compatible with compass oil. For utmost durability a metallic pattern, photo-deposited and plated on semi-matte Mylar sheet could be employed. Trimming is accomplished by darkening with black lacquer, hard pencil or grey epoxy, while lightening may be done by fine scratching of the pattern.

Since the lamp 3 in housing 239 is centrally located and close to the card pivot point, and since the pattern cone is hot-pressed to a radius close to its distance from the pivot point, tilting of the card in rough sea conditions has very little effect on sensor output. The symmetrical location of the lamp 3 removes the necessity for adjusting the light intensity in the horizontal plane as was accomplished by diffusing means 176 and 177 in FIG. 21 of said copending application Ser. No. 769409.

A lamp sensor 237 is shown mounted on the lamp housing 239 opposite a small hole in the housing. The sensor is connected in a regulator circuit 238 to maintain constant lamp output intensity as the lamp and compass oil characteristics change with age and usage.

The unformed, developed pattern is shown in FIG. 2, the mesh width in actual practise being considerably smaller than illustrated therein. In fabrication of the pattern a 10 to 1 enlargement is made of black tape on translucent Mylar. It is found that a $\frac{3}{8}''$ mesh on the enlargement is sufficiently small to yield a monotonic sensor output variation with angle with the photographically reduced pattern.

Circuit connections from the compass pattern and lamp sensors and from the lamp are brought out from the compass tray in loops of very fine Litz wires close to the gimbal pivots 172, 173, 206 and 207 so as to produce negligible drag on the gimbals.

A block diagram of the navigational system is shown in FIG. 27. The compass sensor differential circuits are shown in detail, while the course computer and display components are shown as blocks.

The sine $(\theta-\phi)$ and cosine $(\theta-\phi)$ signals 245 and 244 are applied to multipliers 45 and 44, the other input being the shaped speed signal 243. The outputs 232 and 233 are the off-course and on-course velocity signals respectively which are integrated in integrators 46A and 47A to yield off-course and on-course distance signals 234 and 235 respectively.

The steering angle amplifier 42 and display 41 is the same as in said copending application, the sine signal being utilized directly to expand the center and compress the outer scale of the display meter 41.

In all of the foregoing description, while the craft involved has been shown as a marine vessel, it is to be understood that the systems described are equally applicable to aircraft navigation.

While preferred embodiments of the invention have been set forth for purposes of disclosure, modification to the disclosed embodiments thereof may occur to those skilled in the art. Accordingly, the appended claims are intended to cover all embodiments and combinations thereof which do not depart from the spirit and scope of the invention.

Furthermore it is to be understood that all combinations of the means claimed in this application with the means claimed in copending application Ser. No.

769409, Harold T. Lyman, Jr., are covered in the present application claims.

What is claimed is

1. Improved means for obtaining voltages proportional to the sine and cosine of the angle between the zero angle reference line on a rotatable card or dial and a fixed external reference line, said means comprising a prescribed variable density optical pattern cone on the card or dial, the angular density relation of the cone being expressed by the equation:

$$D' = K_1 + K_2 \cos\theta$$

Where $K_1$ and $K_2$ are constants of proportionality not necessarily equal to each other, and $\theta$ is the angle referenced to the darkest portion of the pattern, the pattern cone having sufficient extent in angle perpendicular to the plane of the card or dial that one-third of the angle can be used for trimming the sine signal and one-third can be used for trimming the cosine signal, with adequate provision for reasonable card or dial tilt without effect on sensor output, a light source illuminating the cone, orthogonal pairs of photo-sensors connected differentially in circuit so as to balance out constant voltages due to diffuse or background illumination or unavoidable minimum pattern density and yielding output voltages proportional to the sine and cosine of the above said angle, one sensor of the sine pair and one sensor of the cosine pair being located on the median plane of the light source and the cone pattern so as to be untrimmed, the second sensor of the sine pair being located for instance opposite the upper trimmed third of the pattern, and the second sensor of the cosine pair being located opposite the lower trimmed third of the pattern.

2. Means of claim 1 in which the pattern cone is bowed with its center of curvature at or near the center of the plane of the edge of the cone which is fastened to the card or dial.

3. Means of claim 2 in which the pattern cone, light source and sensors are contained in a magnetic compass.

* * * * *